United States Patent [19]

Gaiser

[11] Patent Number: 4,499,729
[45] Date of Patent: Feb. 19, 1985

[54] FAST-FILL MASTER CYLINDER

[75] Inventor: Robert F. Gaiser, Stevensville, Mich.

[73] Assignee: The Bendix Corporation, Southfield, Mich.

[21] Appl. No.: 500,515

[22] Filed: Jun. 2, 1983

[51] Int. Cl.³ ............................................... B60T 11/08
[52] U.S. Cl. ........................................... 60/578; 60/591
[58] Field of Search .................. 60/574, 578, 585, 591

[56] References Cited

U.S. PATENT DOCUMENTS

| | | | |
|---|---|---|---|
| 3,147,042 | 9/1964 | Stelzer | 60/574 |
| 4,154,260 | 5/1979 | Shutt | 60/591 |
| 4,170,386 | 10/1979 | Shutt | 60/591 |
| 4,319,456 | 3/1982 | Kubota | 60/591 |

FOREIGN PATENT DOCUMENTS

| | | | |
|---|---|---|---|
| 2000235 | 1/1979 | United Kingdom | 60/574 |
| 2004009 | 3/1979 | United Kingdom | 60/591 |

Primary Examiner—Sheldon J. Richter
Assistant Examiner—Randolph A. Smith
Attorney, Agent, or Firm—Ken C. Decker

[57] ABSTRACT

A fast-fill master cylinder with integral proportioning includes a housing with a stepped bore defining a large diameter and a small diameter. A piston is disposed with the large diameter and the small diameter to form a fast-fill chamber in the large diameter and a pressure chamber in the small diameter. A passage extends between the fast-fill chamber and an outlet port to bypass the pressure chamber.

11 Claims, 2 Drawing Figures

FAST-FILL MASTER CYLINDER

This invention relates to a fast-fill master cylinder wherein a stepped bore is provided to receive a piston forming a fast-fill chamber and a pressure chamber.

It has been proposed to provide a replenishing valve assembly in a reservoir to communicate fluid to the fast-fill chamber and to vent the fast-fill chamber to the reservoir above a predetermined pressure level. During braking the fluid pressure generated in the fast-fill chamber is communicated to the pressure chamber and then to an outlet port coupled to a brake circuit. If the brake application is gradual, it is possible for some of the fluid in the fast-fill chamber to vent through the replenishing valve assembly to the reservoir so that only a portion of the fluid in the fast-fill chamber is utilized to remove hydraulic slack in the brake circuit. The fast-fill chamber must be pressurized above the predetermined pressure level in order to vent the fast-fill chamber to the reservoir. Consequently, a residual pressure may remain in the fast-fill chamber to oppose movement of the piston.

The present invention covers a fast-fill master cylinder comprising a housing with a stepped bore therein defining a large diameter and a small diameter, a piston disposed within the bore in order to define a fast-fill chamber in the large diameter and a pressure chamber in the small diameter, the pressure chamber communicating with an outlet port to communicate fluid from the pressure chamber to a brake circuit during braking when the piston moves within the stepped bore, characterized in that said housing defines passage means extending from said fast-fill chamber to said outlet port independently of said pressure chamber whereby fluid from the fast-fill chamber can communicate directly with said outlet port to bypass said pressure chamber during braking.

It is an advantage of the present invention that a positive displacement is provided for the fast-fill fluid to the outlet port and the fast-fill chamber remains open to the reservoir so long as the fluid pressure in the outlet port is above a predetermined value.

It is another advantage that a replenishing path is provided for the pressure chamber via the outlet port in order to communicate fluid to the pressure chamber from the reservoir.

The invention is illustrated in the attached drawings wherein

Figure 1:
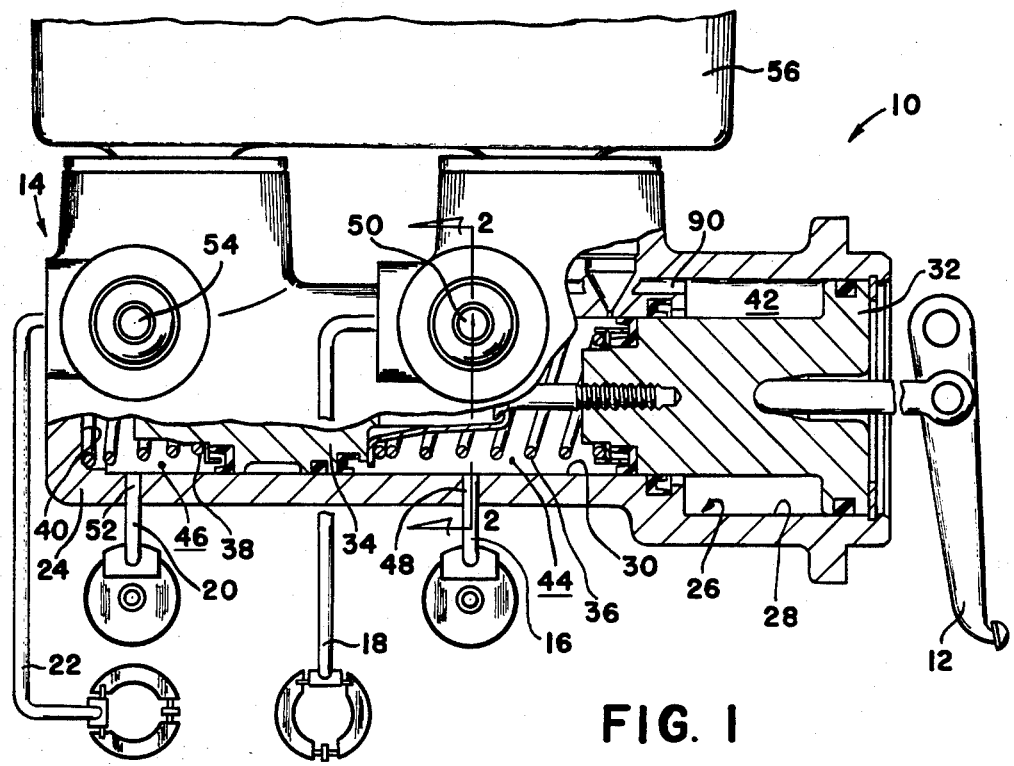
FIG. 1 is a schematic illustration of a brake system.

A brake system 10 includes a brake pedal 12 operable by a vehicle operator during braking, a master cylinder 14 coupled to the brake pedal and a plurality of brake circuits 16-22. With a cross-split brake circuit, the brake circuit 16 extends to the left front wheel, the brake circuit 18 extends to the right rear wheel, the brake circuit 20 extends to the right front wheel, and the brake circuit 22 extends to the left rear wheel.

The master cylinder 14 includes a housing 24 defining a stepped bore 26 with a large diameter 28 and a small diameter 30. A primary piston 32 is movably disposed within the small and large diameters and a secondary piston 34 is movably disposed within the small diameter 30. The primary piston engages a spring 36 between the pistons 32 and 34 while the secondary piston engages a spring 38 extending to an end wall 40 of the stepped bore 26. The primary piston 32 cooperates with the wall of the large diameter 28 to substantially define a fast-fill chamber 42. The pistons cooperate with the wall of the small diameter to substantially define a primary pressure chamber 44. The piston 34 cooperates with the end wall and the wall of the small diameter to substantially define a secondary pressure chamber 46. The primary pressure chamber extends to the brake circuits 16 and 18 via outlet ports 48 and 50 while the secondary pressure chamber extends to the outlet ports 20 and 22 via outlet ports 52 and 54. A reservoir 56 carried by the housing 24 carries brake fluid to communicate the same to the stepped bore as the brake system utilizes more brake fluid in response to lining wear for the brakes of each wheel.

Figure 2:
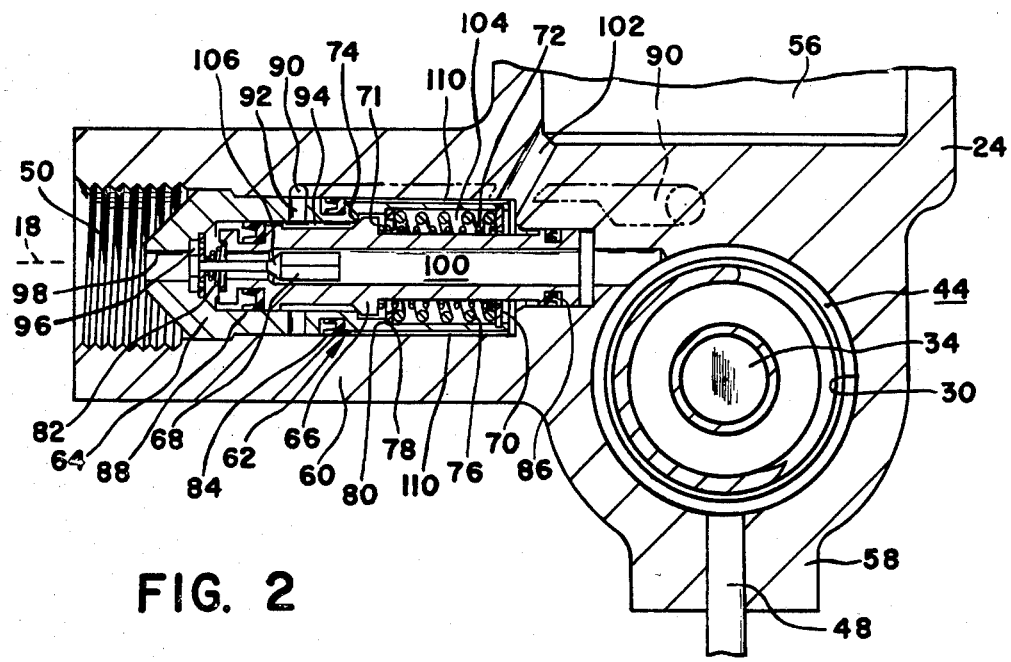
FIG. 2 is a cross-sectional view taken along line 2—2 of FIG. 1.

Turning to FIG. 2, the housing 24 defines a pair of outwardly extending bosses 58 and 60 forming the outlet ports 48 and 50. The outlet port 50 receives a valve assembly 62 cooperating with a tube seat 64. The valve assembly 62 comprises a differential area piston 66 and a poppet 68. The right end of the tube seat 64 carries a spring rest 70. A first or fast-fill spring 72 extends between the rest 70 and a shoulder 71 on the piston 66 to bias the latter away from the bore 30 so that the piston engages a seat 74 on the tube seat 64. A second or proportioning spring 76 extends between the rest 70 and a disc 78 engaging a shoulder 80 on the tube seat 64 and opposing the shoulder 71 but spaced therefrom in the rest position illustrated. A third spring 82 extends from the left end of the piston 66 to the poppet 68 to retain the latter against the tube seat 64. The tube seat carries a U-cup seal 84 engaging the boss 60 and the piston 66 carries an U-cup seal 86 slidably engaging the wall of the port 50 adjacent the bore 26 and a U cup seal 88 slidably engaging the inner bore of the tube seat 64 adjacent the poppet 68. A passage 90 extends from the fast-fill chamber 42 to the outlet port 50 to intersect the latter outwardly of seal 84. The passage 90 is shown in phantom in FIG. 2 even though the cross-sectional view direction of line 2—2 misses the passage. The tube seat includes apertures 92 communicating the passage 90 with a cavity 94 leading to the cup seal 88. The passage 90 is formed within the housing 24 to bypass the primary pressure chamber 44.

During a brake application, fluid trapped in the fast-fill chamber 42 is communicated directly to the outlet port 50 via passage 90, apertures 92, cavity 94, past cup seal 88 and through slots 96 in the poppet 68 adjacent tube seat opening 98. At the same time fluid trapped in the primary pressure chamber is communicated to the outlet port 50 via a central opening 100 within the piston 66, past the poppet 68, the slots 96 and the tube seat opening 98. The effective diameter of the tube seat at seal 86 is smaller than at seal 88 so that during initial fluid pressure build up in the outlet port, the spring 72 will retain the piston against the seat 74. At a first predetermined pressure level in the outlet port, the fluid pressure acting against the piston 66 at seal 88 overcomes the force of spring 72 combined with the fluid pressure acting against the piston 66 at seal 86 so that the piston moves toward the bore 30 to separate from seat 74. As a result, the cavity 94 is opened to a second housing passage 102 leading to the reservoir 56. A radial clearance 104 between the tube seat 64 and the piston 66 receives the springs 72 and 76 and forms a fluid path between the cavity 94 and the second opening 102 when the piston 66 is spaced from the seat 74. At or above the first predetermined pressure level, the passage 90 and fast-fill chamber 42 are communicated with the reservoir so that further movement of the primary piston 32 will not be opposed by a pressure build up in fast-fill chamber 42. With further movement of primary piston 32, the fluid pressure in the primary pressure chamber 44 is increased to communicate the same to the outlet port 50. The increased fluid pressure reaches a second predetermined level when the piston 66 is moved further in the direction of bore 30 to move against springs 72 and 76. When the piston 66 moves against both springs, it approaches a seat 106 on the poppet member 68 to proportion or reduce the fluid pressure communicated to the brake circuit relative to the fluid pressure in the primary pressure chamber 44. The piston 66 is responsive to fluid pressure build up in primary pressure chamber above the second predetermined value to open and close communication past the seat 106 so that the fluid pressure communicated to the brake circuit 18 will be less than the fluid pressure in the primary pressure chamber.

As the fluid pressure is generated in the primary pressure chamber, the piston 34 is moved toward the end wall 40 to develop fluid pressure in the secondary pressure chamber to communicate the same to brake circuits 20 and 22. Similarly, the fluid pressure in the primary pressure chamber 44 is communicated to the brake circuit 16 and the brake circuit 18 as described above.

Upon termination of the brake application, the springs 36 and 38 bias the pistons 32 and 38 to return to their respective rest positions to decrease the fluid pressurein chambers 42, 44 and 46. The piston 66 is moved by springs 72 and 76 in its rest position abutting seat 74 in response to the reduced pressure in chamber 44. In order to replenish fluid to the fast-fill chamber, the tube seat 64 is provided with a radial clearance or slot 110 between the U cup seal 84 and the second passage 102 whereby fluid is free to flow from the reservoir to the passage 90 past U cup seal 84. Similarly, fluid is free to flow from the second passage 102 to the pressure chamber 44 past U cup seal 86.

If it is desired to proportion the fluid pressure communicated to both rear brake circuits, an identical valve assembly 62 could be provided for outlet port 54 and the housing 24 could also be provided with another passage similar to passage 90 to communicate the fast-fill chamber 42 with the outlet port 54.

If it is desired to provide only fast-fill operation for the master cylinder described herein, the poppet member 68 and the springs 82 and 76 and disc 78 can be eliminated so that the spring 72 and piston 66 remain to solely provide for fast-fill operation of the master cylinder.

I claim:

1. A fast-fill master cylinder comprising a housing with a stepped bore therein defining a large diameter and a small diameter, a piston disposed within the bore in order to define a fast-fill chamber in the large diameter and a pressure chamber in the small diameter, the pressure chamber communicating with an outlet port to communicate fluid from the pressure chamber to a brake circuit during braking when the piston moves within the stepped bore, characterized in that said housing defines passage means extending from said fast-fill chamber to said outlet port independently of said pressure chamber whereby fluid from the fast-fill chamber communicates directly with said outlet port to bypass said pressure chamber during braking, and said outlet port receives a proportioning valve assembly which is operable during braking to communicate said passage means and said fast-fill chamber with a reservoir formed by said housing after an initial brake application, said proportioning valve assembly initially communicating fluid pressure freely from said pressure chamber to said brake circuit during braking, and thereafter said proportioning valve assembly being operable to reduce the communication between said pressure chamber and said brake circuit in response to increasing fluid pressure in said pressure chamber.

2. The fast-fill master cylinder of claim 1 in which said proportioning valve assembly carries a cup seal defining one way communication from said passage means to said outlet port.

3. The fast-fill master cylinder of claim 1 in which said proportioning valve assembly is operable in a first condition to open communication between said fast-fill chamber and said reservoir and in a second condition to alter fluid communication between said brake circuit and said pressure chamber.

4. The fast-fill master cylinder of claim 1 in which said proportioning valve assembly is operable to open communication between said fast-fill chamber and said reservoir while at the same time providing communication via said outlet port between said pressure chamber and said brake circuit.

5. The fast-fill master cylinder of claim 1 in which said housing defines second passage means extending between said reservoir and said outlet port and said outlet port includes seal means defining a one-way communication from said reservoir to said pressure chamber.

6. The fast-fill master cylinder of claim 5 in which said housing defines second passage means extending from said reservoir to said outlet port and said tube seat includes seal means defining a one-way communication between said reservoir via said second passage means and said first-mentioned passage means.

7. A fast-fill master cylinder wherein a stepped bore receives a piston to substantially define a fast-fill chamber and a pressure chamber, the piston being movable during braking to communicate fluid from the pressure chamber and the fast-fill chamber to a brake circuit coupled to the fast fill master cylinder via an outlet port, said fast-fill chamber communicating with the brake circuit independently of the pressure chamber, and valve means in the outlet port to communicate the fast-fill chamber with a reservoir when the fluid pressure reaches a predetermined value, said valve means being pressure responsive to reduce fluid communication between said pressure chamber and said brake circuit when the fluid pressure is above the predetermined value, said fast-fill chamber communicating via passage means with said outlet port, and said valve means providing open communication between said pressure chamber and said brake circuit during initial braking when the fluid pressure in the pressure chamber is below the predetermined value.

8. The fast-fill master cylinder of claim 7 in which said valve means includes a first resilient member setting the predetermined value and a second resilient member cooperating with said first resilient member to control the alteration of fluid communication between said pressure chamber and said brake circuit.

9. The fast-fill master cylinder of claim 7 in which said valve means includes a one-way communication seal and said outlet port is in communication with a reservoir carrying fluid whereby fluid from said reservoir is capable of communicating with said pressure chamber via said outlet port and said one-way communication seal.

10. The fast-fill master cylinder of claim 7 in which said valve means includes a piston movable during braking to initially open communication between the fast-fill chamber and the reservoir and thereafter to reduce communication between the pressure chamber and the brake circuit.

11. A fast-fill master cylinder comprising a housing with a stepped bore and a piston movably disposed within the stepped bore to substantially define a primary pressure chamber communicating with a brake circuit via an outlet and a fast-fill chamber communicating with the brake circuit independently of the primary pressure chamber, a proportioning valve disposed in the outlet and defining a one way communication between the brake circuit and the fast-fill chamber via passage means independent from the primary pressure chamber whereby fluid from the fast-fill chamber can flow to the brake circuit via the passage means, the proportioning valve being operable during an initial brake application to freely communicate the pressure chamber with the brake circuit, and the proportioning valve is operable after the initial brake application to open communication between the fast-fill chamber and a reservoir in the housing, and to reduce the fluid communication between the pressure chamber and the brake circuit.

* * * * *